(12) United States Patent
Staber (10) Patent No.: US 6,430,410 B1
(45) Date of Patent: Aug. 6, 2002

(54) TEST FACILITY AND TEST METHOD FOR THE CONTINUOUS MONITORING OF THE SERVICES IN GSM NETWORKS

(75) Inventor: Edwin Staber, Zufikon (CH)

(73) Assignee: Switching Test Solutions AG, Zurich (CH)

( * ) Notice: Subject to any disclaimer, the term of this patent is extended or adjusted under 35 U.S.C. 154(b) by 0 days.

(21) Appl. No.: 09/351,837

(22) Filed: Jul. 13, 1999

(30) Foreign Application Priority Data

Jul. 16, 1998 (DE) .......................................... 198 31 929

(51) Int. Cl.[7] .................................................. H04Q 7/20
(52) U.S. Cl. ...................... 455/423; 455/67.1; 455/67.4; 455/558
(58) Field of Search .............................. 455/423, 425, 455/432, 433, 67.1, 67.4, 558, 550

(56) References Cited

U.S. PATENT DOCUMENTS

| | | | |
|---|---|---|---|
| 5,481,588 A | * | 1/1996 | Rickli et al. .................. 379/32 |
| 5,768,689 A | * | 6/1998 | Borg ......................... 455/67.4 |
| 5,835,564 A | * | 11/1998 | Chang et al. .................. 379/1 |
| 5,931,907 A | * | 8/1999 | Davies et al. ................ 709/218 |
| 5,933,776 A | * | 8/1999 | Kirkpatrick .................. 455/423 |
| 5,987,306 A | * | 11/1999 | Nilsen et al. ............... 455/67.1 |
| 6,118,982 A | * | 9/2000 | Ghisler et al. ............. 455/67.4 |
| 6,230,002 B1 | * | 5/2001 | Floden et al. ................ 455/411 |
| 6,272,450 B1 | * | 8/2001 | Hill et al. ..................... 703/13 |

FOREIGN PATENT DOCUMENTS

DE    19620164    7/1997

\* cited by examiner

*Primary Examiner*—Edward F. Urban
*Assistant Examiner*—Marceau Milord
(74) *Attorney, Agent, or Firm*—Bachman & LaPointe, P.C.

(57) ABSTRACT

The test facility tests whether the services subscribed to by a user in a subscribed network are also available in a visited network. Because the network functions and services should be tested in the same way as a customer actually uses them, they preferably have to be tested from the subscriber network interfaces. The subscriber network interfaces are especially important at the air interface and at the switched network for conventional analogue and ISDN telephone services (Integrated Services Digital Network). However, for special tests internal interfaces of a GSM network (Global System for Mobile Communication) are also of significance such as the A-Interface at the Mobile Switching Center (MSC) of a GSM network.

14 Claims, 5 Drawing Sheets

TEST FACILITY AND TEST METHOD FOR THE CONTINUOUS MONITORING OF THE SERVICES IN GSM NETWORKS

BACKGROUND OF THE INVENTION

The invention covers the field of cellular mobile telephones. It relates to a test facility and a method for its operation for the permanent monitoring of the services provided by a GSM network (Global System for Mobile Communication). In particular checks are made whether the services subscribed to by a user in his/her home network or at his/her home location are also available in the visited network or location respectively. Apart from these so-called roaming tests it is also of interest as to with what quality the services offered in the GSM network are available. Because the network functions and services should be tested in the same way as a customer actually uses them, they logically have to be tested from the customer network interfaces. The customer network interfaces at the air interface are of particular importance, i.e. to the mobile station (MS), and at the switched network for conventional analogue and ISDN telephone services (Integrated Services Digital Network). However, for special tests internal interfaces of the GSM network are also of significance such as the so-called A-Interface at the MSC (Mobile Switching Center).

Mobile communication networks such as the GSM (Global System for Mobile Communication) are experiencing increasing customer numbers due to good availability, fast connection capabilities and worldwide ability for contact under the same number. To ensure that such a highly complex system functions efficiently and reliably under varied peripheral conditions, a series of measures is necessary. One of these measures is the almost continuously conducted testing of the various functions of networks and the services provided which are subject to constant modifications, especially expansions. Since a radio transfer is exposed to substantially greater interference effects overall than a transfer by cable, the testing of the so-called air interface, i.e. the radio link between the mobile customer terminal, the mobile station (MS), often just called Handy, and the so-called base station, i.e. the sending/receiving station at a fixed location, is therefore on one hand especially important. On the other hand the number of interfaces is also increasing rapidly at other locations, as explained below, so that it can be useful to include these in tests if reliable results are to be obtained.

For testing the air interface within a mobile communication network the use of automated test facilities for alternate routing and toll billing, is already known. Such a facility and the appropriate operating method are described in German patent document DE 196 20 164. The test facility described in this document consists essentially of a special mobile station (MS), also known as Handy, which is equipped with a wire-bound interface, a multiplexor to hold and alternately operate several data modules, i.e. SIMs (Subscriber identity Modules), and a computer which controls the whole facility. Instead of a SIM the MS contains an adapter module which is connected to the multiplexor via cable in such a way that each of the SIMs contained in the multiplexor is emulated in the MS. The selection of the respectively required SIM and the control of the entire test process are performed by the control computer which has to be connected to the MS and to the multiplexor for this purpose.

Undoubtedly the facility described in DE 196 20 164 already permits an automated test of alternate routing and toll billing. The disadvantage however is that a multitude of multiplexors have to be placed at different locations in order to conduct tests that extend across an entire network and, if necessary, several countries. Such extended tests have today become indispensable because of the continuously increasing roaming possibilities. Roaming is the use of an MS outside the home network in which it is registered and in whose data banks its data is stored.

In addition the focus on testing of the air interfaces alone is no longer sufficient because the number of other gateways is also increasing. As a result of the steadily increasing number of network operators to which deregulation in many countries is contributing, the number of gateways between mobile communication networks on the one hand is growing as well as the number of network gateways to switched networks and between these networks. Therefore it is appropriate and necessary to also include switched network gateways in the tests.

This is connected to the fact that a SIM is required in all network accesses which are to be tested, for the international and national roaming test from each network or from each location within a network respectively. The configuration with distributed SIMs demands a substantial effort with regard to establishing the configuration. On one hand the number of roaming agreements grows with the increase in mobile communication networks, on the other hand, with the increase in customers, the number of MSC (Mobile Switching Center) and therefore the locations within the network necessarily rise. In order to guarantee the total availability of the services for network subscribers and roaming customers at any time tests have to be performed with each SIM at each location which in turn requires a large number of SIMs at each location. The expansion of the networks, usually nationally if not internationally, makes the maintenance of these extensive sets of locally distributed SIMs more difficult and requires substantial effort in terms of material and time.

SUMMARY OF THE INVENTION

It is therefore the task of the invention to establish a test facility and a test method which is capable of solving the problems outlined. For this, it should be possible to perform tests efficiently for already existing data networks as centrally as possible from a single location. In other words, it will be possible to use the invention immediately without any change or extension to existing mobile communication networks. It will furthermore be adaptable in the respect that it can be adapted to network changes or expansions using a simple modification, preferably of the software, at a central location when the roaming agreements as well as the number of customers and the resulting increase in Home Location Register (HLR) grow which require a change of one or more tests or parts thereof.

These tasks are solved in principle by the fact that according to the invention at least one central server is provided which can adopt a multitude of SIMs, and that a large number of geographically distributed mobile stations equipped with adapter modules or mobile stations simulated by software processes can access this central server via at least one existing data network so that each SIM can be emulated in each of the distributed mobile stations. Further forms of the invention can be derived from the instant disclosure and, details can be collected from the following description.

The test facility according to the invention not only makes it possible to continuously monitor the availability of the services provided, but also to alter these tests constantly and, whenever necessary, to adapt them to the growing demands efficiently. In particular the following tests should be performed or the following services should be tested respectively:

Basic Services, i.e. the basic services which are available to every customer

Supplementary Services, i.e. the supplementary services such as call forwarding, call suspending Data and fax services, i.e. non-linguistic services that can process many MS Toll estimation, i.e. the toll billing, calculation and, if necessary, display International Roaming, i.e. the trunking scheme outside the home country National Roaming, i.e. the trunking scheme outside the location in which the relevant SIM is registered.

BRIEF DESCRIPTION OF THE DRAWINGS

To follow an embodiment of the invention is described in detail in conjunction with the figures.

In the figures below

DETAILED DESCRIPTION OF PREFERRED EMBODIMENTS

In order to use the services provided by a GSM network the confidential algorithms which are stored in the SIM and the key which is dependent on the network operator are necessary for authentication, identification and coding. Without this information it is not possible to utilize the services offered.

The test system essentially uses test modules (TM) which provide test accesses via so-called A-Interfaces, air interfaces and/or conventional switched network interfaces. The functions of the MS are simulated at an A-Interface using software processes. At an air interface commercially available MS are used. Both test methods use real SIMs for reasons of confidentiality regarding the algorithms and keys. Normally the SIMs are either located directly in the mobile stations (MS) or the software process accesses a SIM directly. But because there is a larger number of spatially distributed MS and software processes present in a test system the number of SIMs required is normally also provided at each location. In other words, depending on the type of test a certain selection and number of SIMs have to be made available continuously or temporarily at each location or at certain locations respectively. It is obvious that this is time-consuming and costly because of the spatial distribution. This problem is solved by the centralized SIM card server (SKS) according to the invention. Such a centralized SKS additionally offers two further advantages. Firstly, the number of required SIMs is reduced and secondly, temporary allocations of all SIMs can be actioned from the central SKS, i.e. a central work place.

The test system according to the invention then uses the data communication already available between Mobile Switching Centers (MSCs), Visitor Location Registers (VLRs) and Home Location Registers (HLRs) for testing as well. In each GSM network a cross-linking of the VLRs and HLRs exists in the appropriate routing in order to check the data and registrations of users. This existing function is now also used for networking of test modules (TM) and SKS. It is known to the expert that separate addresses have to be defined for each TM and SKS and that routing within the network has to be configured accordingly.

In order to perform roaming and mobile service tests the following data is of importance and needs to be determined before the test commences:

Test data, i.e. SIM dependent data such as the International Mobile Subscriber Identity (IMSI) or the Mobile Station Integrated Service Digital Network Number (MSISDN);

Test cases, i.e. prepared test cases that can be compiled to form a test campaign in order to obtain particular test objectives using for example the international roaming tests as specified in a Memorandum of Understanding of the International Expert Group (MoU IREG);

The system configuration, i.e. number of test modules (TM), positions and addresses of the SIMs, network addresses etc.

To follow an embodiment of the test system will now be described in detail using the figures.

Figure 1:
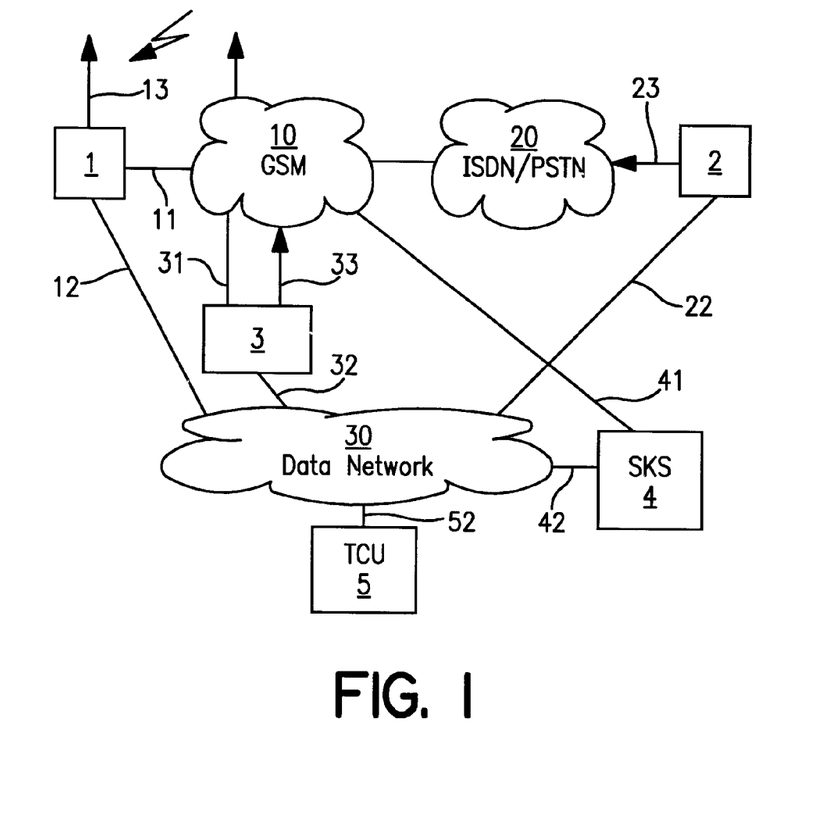
FIG. 1 shows a general view of the test facility

In FIG. 1 the test system is shown in a typical environment. A GSM network 10, a ISDN or PSTN network 20 (PSTN stands for Public Switched Telecommunication Network) and a data network 30 form the basic structure of the network. While the GSM network in this example has a fixed connection to the ISDN/PSTN network the other connections are interfaces to be tested for which test modules are provided: a test module 1 for an air interface between the GSM network 10 and the data network 30, a test module 2 for a so-called switched network interface between the switched ISDN/PSTN network 20 and the data network 30 as well as a test module 3 for an A-Interface between a Mobile Switching Center (MSC) of a GSM network 10 and the data network. The test modules which are shown as simple box elements in FIG. 1 are in reality complex arrangements as will be explained in more detail below. Furthermore in FIG. 1 the SIM card server (SKS) 4 is shown which is connected to the GSM network 10 via cable 41 and to the data network 30 via cable 42, and the test control unit (TCU) 5 which is connected to the data network via connection 52.

It is known to the expert that the test modules are functionally connected to the respective networks 10, 20 and 30, for example via cables 13, 23 and 33 for the test accesses, via cables 12, 22, 32 and 52 as control connections (control links) between the test modules (TM) 1 and 3, the SKS 4 and the TCU 5, and via 11, 31 and 41 for communication between the test modules 1 and 3 and the SKS 4. The test access 13 can be performed via a cable or the air, i.e. a radio connection. The remaining connections are self-explanatory.

Figure 2:
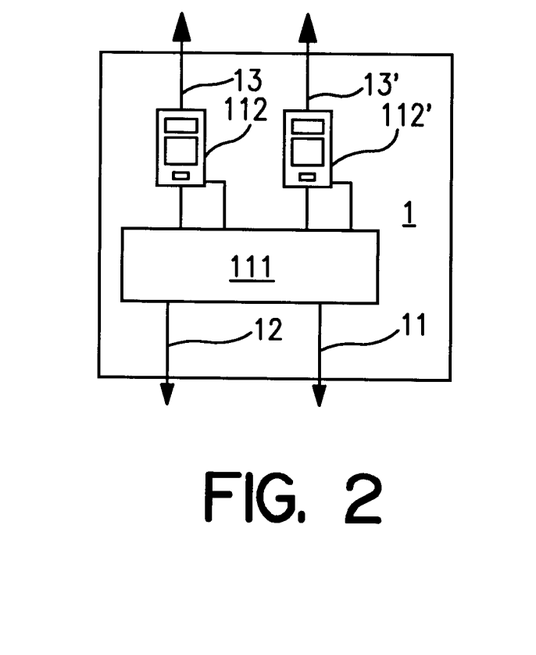
FIG. 2 shows a test module for air interfaces

In FIG. 2 the test module 1 for the air interface is shown in detail. In this example two mobile stations (MS) 112 and 112' are connected to a local control unit 111. The MS 112 and 112' contain, as known previously, no SIM but one adapter each inserted in place of the SIM. The MS 112 and 112' and the adapter (not shown) are connected to the control unit 111. Since it is known the MS 112 and 112' are capable of communicating with the mobile communication network 10 (GSM in FIG. 1) via radio 13 or cable. The control unit 111 is also connected to the mobile communication network 10 via cable 11 and to the data network 30 (FIG. 1) via cable 12. The function of the test module 1 is as follows:

The test module 1 receives all data required for carrying out the test from the TCU 5 via the data network 30 and cable 12. As a rule this is a so-called test campaign which consists of a sequence of single test cases, i.e. test cases or test calls. In order to avoid time collisions of the test calls the test modules are coordinated by a time slot.

The test campaign is stored in the control unit 111. The latter works through the individual test cases step by step at a predetermined start time. Then it controls the individual MS 112 and 112' and transfers the required test parameters such as MSISDN number, test files etc, to them via the serial interface. At the same time the control unit 111 establishes communication with the SKS 4 via cable 11 and the mobile radio network 10. The address of the SIM belonging to a test case is transferred together with test data from the TCU 5 via cable 12.

Figure 3:
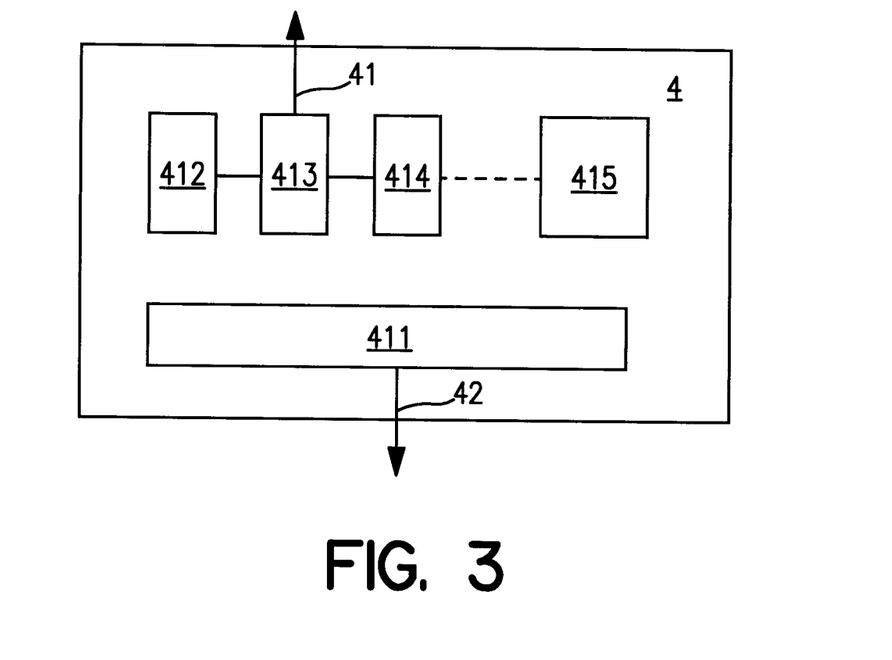
FIG. 3 shows the central SIM server

FIG. 3 shows the central SIM card server (SKS) 4. Subscriber Identification Modules, i.e. SIMs, are commonly also called SIM cards; with exception of the SKS the expression SIM will preferably be used in this context.

The SIM card server (SKS) 4 in FIG. 3 consists of a local control unit 411, an internal controller 412, a 2 Mbit/s-Interface 413, a SIM controller 414 and a number of SIM card units 415. The local control unit 411 establishes communication between the TCU 5 and the internal controller 412 via the data network 30. The configuration of the SKS 4 such as the querying of the SIM data, positions etc, is carried out via the local control unit 411 and the link 42 to the TCU. The internal controller 412 controls the communication of the interface 41 of interface 413 to the GSM network 10. The SIM controller 414 routes the messages arriving from the test modules 1 and 3 to the addressed SIMs and the answers back to the test modules respectively.

Figure 4:
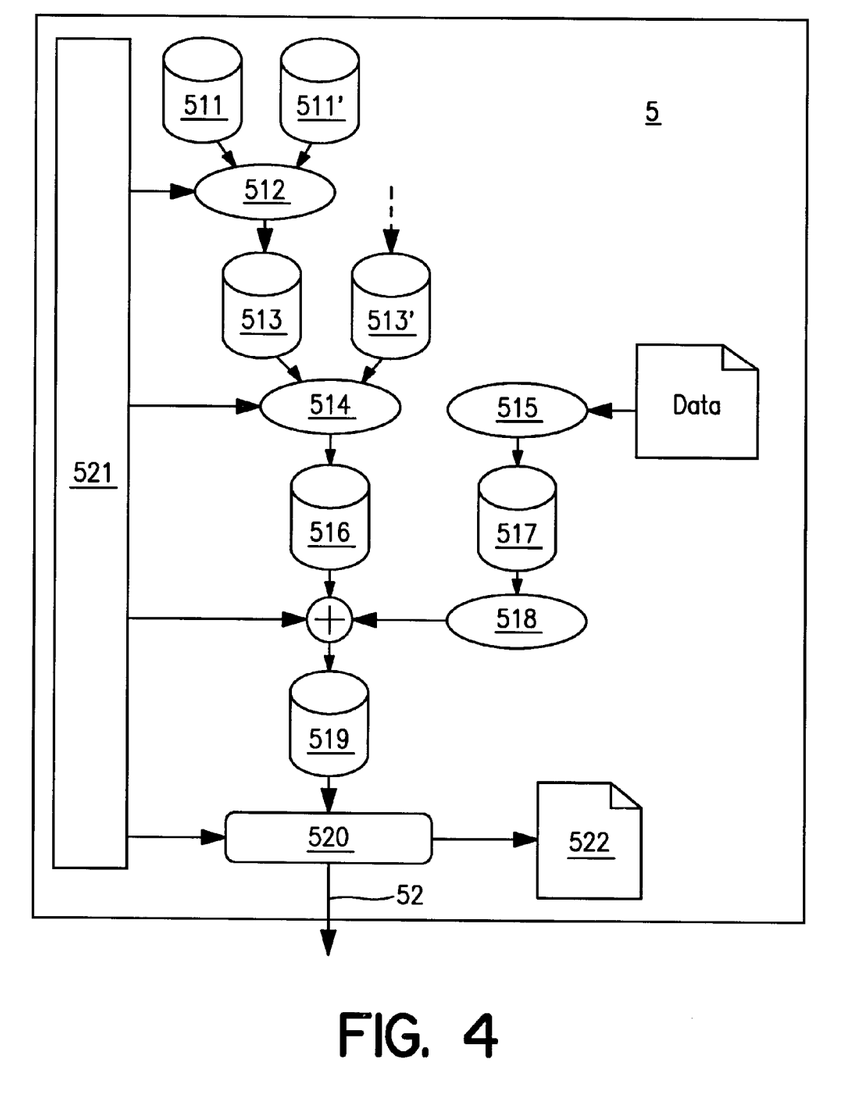
FIG. 4 shows details of the control unit

FIG. 4 shows the test control unit 5 (control unit TCU) in detail. Inside this unit the test cases required which are in turn stored in units 513, are created from single test steps stored in storage units 511 with the help of a test case editor 512. Using a test sequence editor 514 test cases are transformed into test sequences which are stored in readily retrievable form in units 516. By combining the test sequences from storage unit 516 with configuration data from the SIMs placed in the SKS 4 and the operator specific data via units 515, 517 and 518, the aforementioned running test campaigns are created, i.e. extensive test procedures which are stored in unit 519. Via the operating console 521 the test data is acquired as specific data concerning the operator, SIM data etc.

With the help of the scheduler 520 a test campaign can be executed automatically through time control. In short, the control unit 5 will ensure that the individual components of the test cases, together with all necessary parameters, are loaded into the appropriate test modules 1, 2 and 3.

Each of the test modules 1, 2 and 3 then implements the relevant test cases at its respective interface. Since the test parameters mentioned also include the position and address of the SIMs, each of the test modules 1 and 3 is capable of communicating with the SIM predetermined by the test case, in the SKS 4 via the GSM network 10.

In this way all test cases contained in a test campaign are executed. At the end of a test campaign the results determined are stored in the control unit 5 and edited for a later display, symbolized by printout 522, for example in graphic or alphanumeric form.

Figure 5:
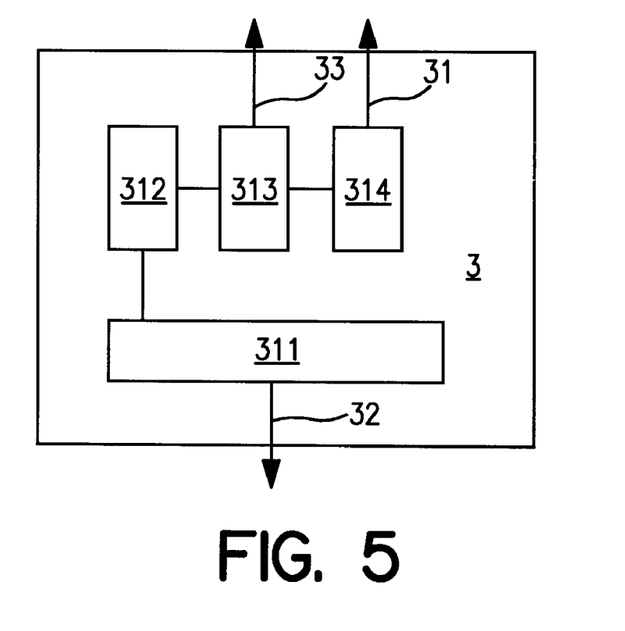
FIG. 5 shows a test module for A-Interfaces

In FIG. 5 the test module 3 for the A-Interfaces is shown. Similar to the SKS 4 described above this module consists of a local control unit 311, an internal controller 312, a 2 Mbit/s interface 313 for test access to the A-Interface 33 and a second 2 Mbit/s interface 314 for connection via cable 31 with the SKS 4. The local control unit 311 establishes communication between the TCU 5 and the internal controller 312. In test module 3 the MS are emulated on the internal controller using software processes. For authentication this controller 312 communicates with the SKS 4 via the interface 314 and the link 31.

Figure 6:
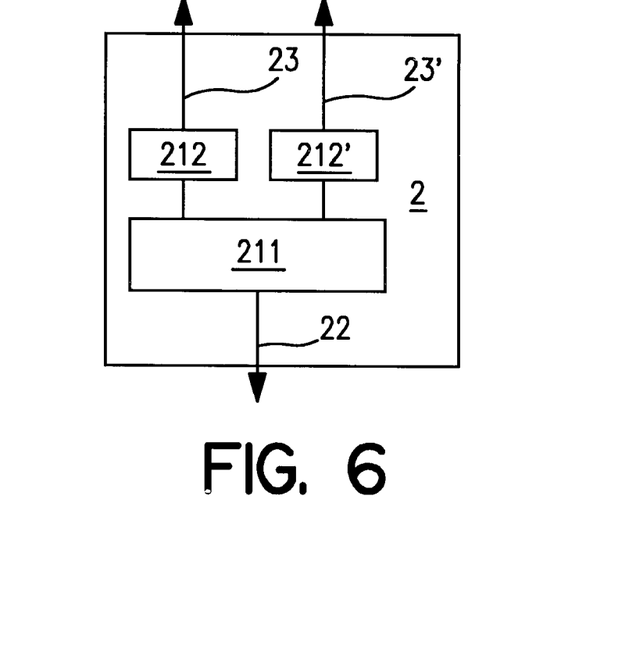
FIG. 6 shows a test module for switched net interfaces

In FIG. 6 the test module 2 for the switched network interfaces is shown. This test module is assembled in a similar way to the test module 1 as described above. It consists of a control unit 211 and two or more modems 212 and 212' which permit the test access to the switched network via links 23 and 23'. According to demand these modems 212 are equipped for analogue connections or ISDN connections. The test process is similar to test module 1 with the difference that in this case no connection to the SKS 4 is required.

Figure 7:
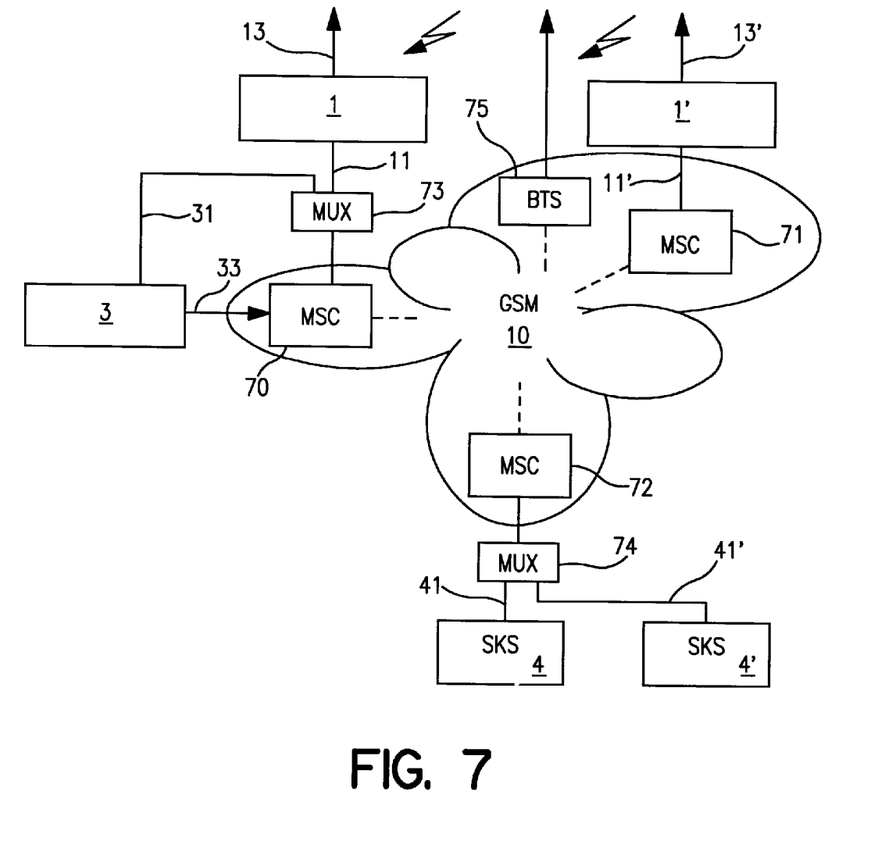
FIG. 7 shows an example how to connect the SIM server to the GSM network

Finally, in FIG. 7 the concept of the invention is illustrated. Shown are the GSM network 10 with some of its accesses, in particular the Mobile Switching Centers (MSC) 70, 71 and 72 and by way of example a Base Transceiver Station BTS 75, i.e. a base station for sending and receiving, which enables radio connection to the mobile stations 1 and 1' shown. Some of the components which exist in reality such as the data network 30 and the control unit 5 are not shown in FIG. 7 in order to retain clarity. In addition the networking of several test modules 1 and 3 with the SKS 4 is shown. The networking is carried out via the MSC 70, 71 and 72 and the data channels available in the GSM network 10; the MSCs and also the data channels are required for the operation of the system and are therefore available anyway. For this purpose each of the test modules 1 to 3 as well as the SKS 4 feature a 2 Mbit/s interface for the connection to the so-called C/D interface of a MSC. For each test case requiring a SIM the associated test module 1 or 3 is sending a relevant message (for example "RAND" a message commonly used for authentication) to the address of the affected SIM within the SKS 4 as well as the point code, i.e. the IP address of the SKS 4. This address enables on one hand the data network 30. to route messages to the correct address and on the other hand enables SKS 4 to forward messages to the required SIM. Each message carries at least the identification (sender address) of the test module in order to be able to route the answers to the querying test module.

At the same time each of the test modules (TM) 1, 2 or 3 as well as the SKS 4 can be connected to a 2 Mbit/s trunk either directly or via a multiplexor (MUX) 73, 74. As only one time slot with 64 Kbit/s is required per test module or SKS 4 this time slot can simply be extracted from a 2 Mbit/s trunk using a MUX 73 or 74. The connection established in this way is used exclusively for communication between the SKS 4 and the respective TM. The additional load for the network is minute because only a few messages are required per trunking scheme and mobile station.

The SIM card server 4 can be assembled in modular form from units whereby a single SKS unit, shown in FIG. 7 as SKS 4' and SKS 4", can handle up to 568 SIMs and make them available to a test system with several test modules 1 and 3. These SKS units can be arranged either integrated or separately. If they are arranged separately the units can be set up at the same location as well as at different locations. Several of the test modules 1 and 3 and several test cases can then access each of the SKS units in a quasi-parallel way, i.e. a virtually entire parallel operation is possible. If necessary, several SKS units can be integrated so that the number of SIMS available for the tests can in practice be increased to any desired level.

The separate data network which, for example, can be developed as a LAN or WAN or also as a X 25 network is also being used for controlling and configuring the test system and for transferring the results.

The following list of reference characters is presented in detail in order to provide the expert with a detailed impression of an embodiment of the invention in conjunction with the figures and the aforementioned description.

LIST OF REFERENCE CHARACTERS

FIG. 1 General View
1 Test module for the air interface
2 Test module for the ISDN or analogue interface
3 Test module for the A-Interface
4 SIM card server (SKS), in FIG. 7 also 4' and 4" one unit each
5 Test control unit (TCU)
10 Global System for Mobile Communication (GSM)
11 Data link from test module 1 to SKS 4 via GSM network 10
12 Control link from test module 1 to the TCU 5 via data network 30
13 Radio connection to the GSM network 10
20 Switched network, for example Integrated Services Digital Network (ISDN) and/or Public Switched Telecommunication Network (PSTN)
22 Control link from test module 2 to the TCU 5
23 Test connection for analogue and/or ISDN telephone services
30 Data network, for example a LAN, WAN or X 25 network between the TCU 5, the SKS 4 and the test modules 1, 2 and 3
31 Data link from the test module 3 to the SKS 4
32 Control link from the test module 3 to the TCU 5
33 A-Interface (at the Mobile Switching Center, MSC, see FIG. 7)
41 Data link from the SKS 4 to the test modules 1 and 3
42 Control link from the TCU 5 to the SKS 4
52 Control link from the TCU 5 to the SKS 4 and the test modules 1, 2 and 3
FIG. 2 Test Module for the Air Interface
11 Data link to the SKS 4 via GSM network 10
12 Control link to the TCU 5 via data network 30
13, 13' Radio connections to the GSM network 10
111 Local control unit
112, 112' Mobile stations (MS)
FIG. 3 Central SIM Card Server (SKS)
41 Data link to the test modules 1 and 3 via GSM network 10
42 Control link to the TCU 5 via data network 30
411 Local control unit for communication with the TCU 5
412 Internal controller for communication with the test modules 1 and 3
413 Interface for connection to the GSM network 10
414 Controller for the SIM card unit 415
415 Modular SIM card unit with a multitude of SIMs
FIG. 4 Control Unit, Test Control Unit (TCU)
52 Control cable to the test modules 1, 2 and 3 and to the SKS 5
511 Memory for test steps
512 Test case editor
513 Memory for test cases
514 Test sequence editor
515 Entry of the test data, manually or machine readable test data
516 Memory for test sequences
517 Memory for test data
518 Editor for test data and creation of feasible test campaigns
519 Memory for test campaigns
520 Scheduler for control of the chronological test process
521 Operating unit
522 Output of the test results
FIG. 5 Test Module for the A-Interface
31 Data link to the SKS 4 via GSM network 10
32 Control link to the TCU 5 via data network 30
33 A-Interface (test access at Mobile Switching Center, MSC, see FIG. 7)
311 Local control unit for communication with the TCU 5
312 Internal controller for communication with the A-Interface 33 and the SKS 4
313 Interface for connection to the A-Interface 33 (test)
314 Interface for connection to the GSM network 10
FIG. 6 Test Module for the Switched Network Interface
22 Control link to the TCU 5 via data network 30
23, 23' Test access to analogue and/or ISDN telephone services of network 20
211 Local control unit for communication with the TCU 5
212, 212' Modems
FIG. 7 Example for Connection of a SIM Server to a GSM Network
1, 1' Test module for the air interface
3 Test module for the A-Interface
4, 4' SIM server, one unit each
10 GSM network
11, 11' Data links
13, 13' Radio connections
31 data link
33 A-Interface
41, 41' Data links
70 Mobile Switching Center (MSC)
71, 72 further MSCs
73, 74 Multiplexor (MUX)
75 Base Transceiver Station (BTS) for radio connection
70–75 are internal components of the GSM 10

What is claimed is:

1. A test facility for the monitoring of the communication circuits including the air interfaces and the gateways in a mobile communication network consisting of network switched systems, whose subscriber mobile stations are equipped with a Subscriber Identification Module (SIM) identifying the subscriber whose data is stored at least partly in at least one data bank of a switching system with
one mobile station which is equipped with an adapter module in place of the SIM, which can selectively be connected to each one of the multitude of SIMs so that each of the connected SIMs is emulated in the mobile station equipped with the adapter module,
a device for holding the SIMs and
a control unit which controls the selection and connection of the SIMs to the mobile station containing the adapter module,
wherein
the device for holding the SIMs is designed as a central SIM server,
the control unit is located centrally,
different test modules are provided spatially distributed containing mobile stations that are at least partially equipped with adapter modules, and
SIM server, control unit and test modules are connected via a data network connecting the switching systems.

2. A test facility according to claim 1, wherein
at least one part of the spatially distributed test modules contains software which simulates a mobile station and has access to the SIMs in the SIM server.

3. A test facility according to claim 1, wherein
at least one part of the spatially distributed test modules contains software which simulates further network subscribers without having access to the SIMs in the SIM server.

4. A test facility according to claim 1, wherein
the data network is an available partial network.

5. A test facility according to claim 4, wherein
the data network is a service network for maintaining a GSM network.

6. A test facility according to claim 1, wherein
several tests can be performed by the control unit at virtually the same time whereby several of the spatially distributed mobile stations equipped with adapter modules access the SIM server.

7. A test facility according to claim 1, wherein
the test modules provide the test access via at least one of an air interface and an A-Interface whereby
the test access via the A-Interface is carried out by software simulation and
the test access via the air interface is carried out by mobile stations which are equipped with adapter modules.

8. A test facility according to claim 1, wherein
the SIM server is connected directly with the control unit instead of via the data network.

9. A test facility according to claim 1, wherein
the SIM server and control unit form a unit.

10. A test facility according to claim 1, wherein
the SIM server and the control unit are exclusively connectable to particular test modules via a GSM network.

11. A test facility according to claim 1, wherein
the SIM server consists of modular units, whereby each of the modular units can hold a multitude of SIMs, and
the modular units are jointly controlled by the control unit.

12. A method for the operation of a test facility according to claim 1, wherein by means of the control unit
each of the mobile stations equipped with an adapter module and distributed spatially is selectively connected, at least virtually, to each one of the SIMs in the SIM server so that each selected mobile station emulates the respective connected SIM, and
particular test modules which are distributed spatially are triggered by these mobile stations equipped with adapter-modules, via the data network.

13. A method for the operation of the test facility according to claim 1, wherein
each one of the spatially distributed test modules is selectively allocated to one of the mobile stations which are equipped with an adapter module and distributed spatially, and
the connection or respective allocation is carried out by the centrally located control unit.

14. A method for the operation of the test facility according to claim 1, wherein
several tests are performed by the control unit at virtually the same time whereby several of the spatially distributed mobile stations equipped with adapter modules access the SIM server.

* * * * *